(12) United States Patent
Chu et al.

(10) Patent No.: US 10,224,690 B1
(45) Date of Patent: Mar. 5, 2019

(54) LASER APPARATUS AND LASER GENERATION METHOD

(71) Applicant: NATIONAL CHENG KUNG UNIVERSITY, Tainan (TW)

(72) Inventors: Shu-Chun Chu, Tainan (TW); Ko-Fan Tsai, Chiayi (TW)

(73) Assignee: NATIONAL CHENG KUNG UNIVERSITY, Tainan (TW)

(*) Notice: Subject to any disclaimer, the term of this patent is extended or adjusted under 35 U.S.C. 154(b) by 0 days.

(21) Appl. No.: 15/826,699

(22) Filed: Nov. 30, 2017

(30) Foreign Application Priority Data

Oct. 24, 2017 (TW) .............................. 106136572 A

(51) Int. Cl.
*H01S 3/139* (2006.01)
*H01S 3/08* (2006.01)
*H01S 3/10* (2006.01)
*H01S 3/106* (2006.01)
*H01S 3/102* (2006.01)
*H01S 3/16* (2006.01)
*H01S 3/091* (2006.01)
(Continued)

(52) U.S. Cl.
CPC ........ *H01S 3/1396* (2013.01); *H01S 3/08004* (2013.01); *H01S 3/086* (2013.01); *H01S 3/08054* (2013.01); *H01S 3/08059* (2013.01); *H01S 3/0912* (2013.01); *H01S 3/102* (2013.01); *H01S 3/107* (2013.01); *H01S 3/10053* (2013.01); *H01S 3/1065* (2013.01); *H01S 3/1611* (2013.01); *H01S 3/1671* (2013.01)

(58) Field of Classification Search
CPC ...... H01S 3/1396; H01S 3/102; H01S 3/1065; H01S 3/10053; H01S 3/1671; H01S 3/08054; H01S 3/08004; H01S 3/1611; H01S 3/08059; H01S 3/086; H01S 3/0912; H01S 3/107
See application file for complete search history.

(56) References Cited

U.S. PATENT DOCUMENTS 3,918,007 A * 11/1975 Waksberg ................ G02F 1/21
372/106
9,588,488 B2 3/2017 Ngcobo et al.
(Continued)

FOREIGN PATENT DOCUMENTS

CA 2841700 A1 9/2014
WO WO2007/064298 * 6/2007

*Primary Examiner* — Dung Nguyen
(74) *Attorney, Agent, or Firm* — CKC & Partners Co., LLC

(57) ABSTRACT

A laser apparatus is provided, which includes an optical reflection and gain unit, an optical modulation unit and a polarizing selection unit. The optical reflection and gain unit includes a gain medium and at least two dichroic surfaces, and is configured to generate a laser beam. The optical modulation unit and the optical reflection and gain unit form a cavity, and the optical modulation unit is configured to adjust phase boundary conditions of the cavity. The optical modulation unit includes portions that respectively correspond to optical phase boundaries in the cavity, so as to allow an optical field in the cavity to pass through the optical modulation unit at least twice. The polarizing selection unit is disposed between the optical reflection and gain unit and the optical modulation unit, and is configured to adjust the polarizing direction of the optical field incident to the optical modulation unit.

20 Claims, 13 Drawing Sheets

(51) Int. Cl.
*H01S 3/086* (2006.01)
*H01S 3/107* (2006.01)

(56) References Cited

U.S. PATENT DOCUMENTS

| | | | |
|---|---|---|---|
| 2006/0199081 A1* | 9/2006 | McLaughlin | G03F 7/001 |
| | | | 430/1 |
| 2015/0009547 A1 | 1/2015 | Ngcobo et al. | |
| 2016/0344157 A1* | 11/2016 | Chou | H01S 3/2308 |

* cited by examiner

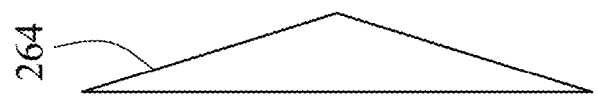
FIG. 3

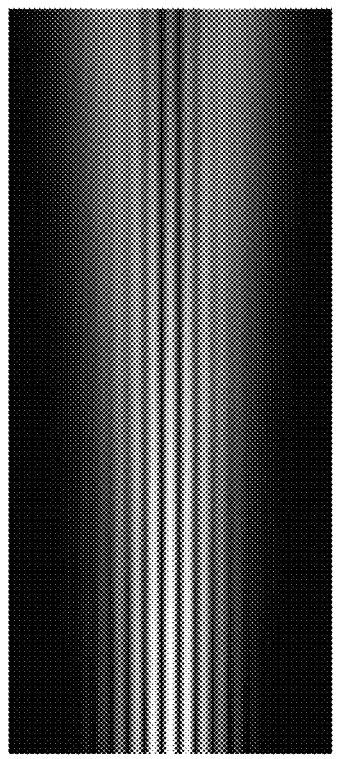
FIG. 8A
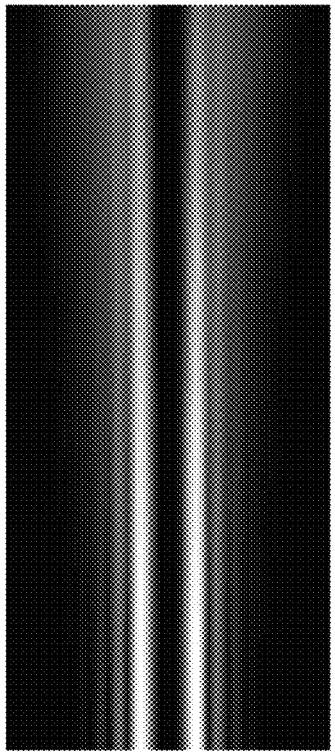
FIG. 8B
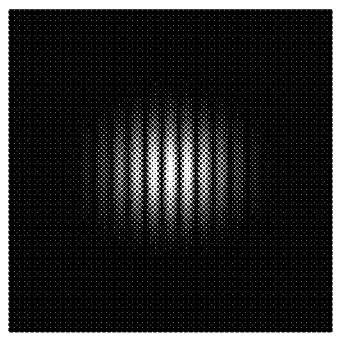
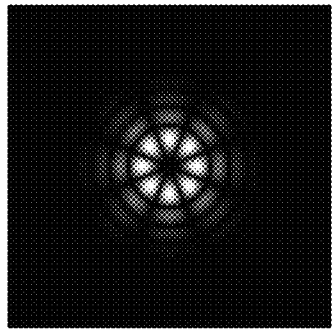

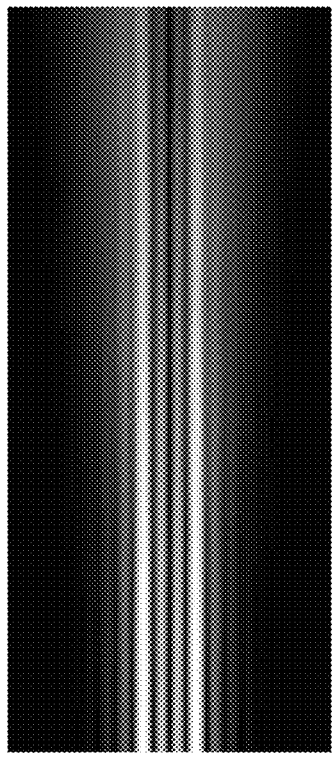
FIG. 8C
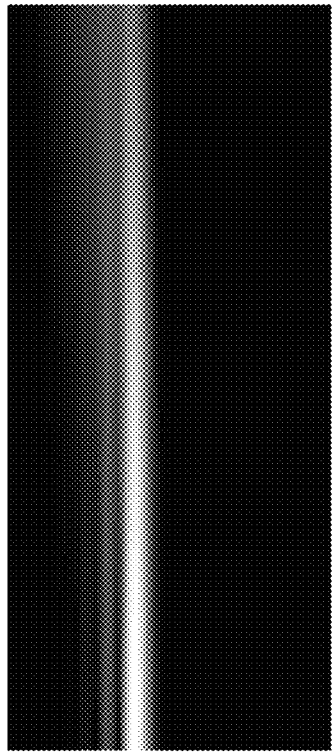
FIG. 8D
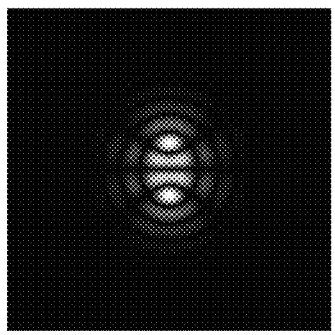
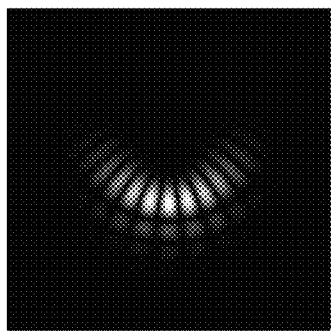

LASER APPARATUS AND LASER GENERATION METHOD

RELATED APPLICATIONS

This application claims priority to Taiwanese Patent Application Serial Number 106136572, filed on Oct. 24, 2017, which is herein incorporated by reference.

BACKGROUND

Field of the Invention

The invention relates to a laser apparatus and a laser generation method, and more particularly to a laser apparatus and a laser generation method which can generate various and more stable laser modes or a superposition of various laser modes for outputting.

Description of Related Art

With the advance of technology, nowadays laser technologies are widely applied to manufacture and process of biomedicine, military, communication and traditional industries and high technology industries. On the other hand, the known art has achieved generating various modes of laser beams by a laser system for outputting, such as Hermite-Gaussian beams or Laguerre-Gaussian beams. However, the known art can only output laser modes of limited types at the same time. There is still a plenty of room for improvement with regard to the quality of a generated non-diffracting optical beam and how to output generate various superpositions of different laser modes for outputting. Therefore, how to generate a non-diffracting optical beam with high quality and how to generate various superpositions of different laser modes for outputting are still urgent issues to be solved in the related industries.

SUMMARY

The objective of the invention is to provide a laser apparatus and a laser generation method. The cavity formed according to the laser apparatus and the laser generation method of the invention has multiple controllable phase boundaries therein, so as to allow an optical field in the cavity to pass through an optical modulation unit at least twice and to provide more and further complete controls on boundary conditions, thus generating more various and more stable laser modes or a superposition of various laser modes for outputting.

One aspect of the invention is directed to a laser apparatus which includes an optical reflection and gain unit, an optical modulation unit and a polarizing selection unit. The optical reflection and gain unit has a gain medium and at least two dichroic surfaces, and is configured to generate a laser beam. The optical modulation unit is configured to form a cavity with the optical reflection and gain unit and to adjust phase boundary conditions of the cavity. The optical modulation unit has portions that respectively correspond to phase boundaries in the cavity, so as to allow an optical field in the cavity to pass through the optical modulation unit at least twice. The polarizing selection unit is arranged between the optical reflection and gain unit and the optical modulation unit, and is configured to adjust a polarizing direction of the optical field incident to the optical modulation unit.

In one or more embodiments of the invention, the optical modulation unit is a spatial light modulator (SLM).

In one or more embodiments of the invention, the optical modulation unit is a liquid crystal on silicon (LCoS) panel.

In one or more embodiments of the invention, the optical modulation unit is a digital micromirror device (DMD).

In one or more embodiments of the invention, the optical reflection and gain unit further includes two dichroic mirrors. The dichroic mirrors respectively have two of the dichroic surfaces, and the gain medium is arranged between the dichroic mirrors.

In one or more embodiments of the invention, two of the dichroic surfaces are two side surfaces of the gain medium.

In one or more embodiments of the invention, the optical reflection and gain unit further includes a dichroic mirror. The dichroic mirror has one of the dichroic surfaces, and the gain medium has another one of the dichroic surfaces.

In one or more embodiments of the invention, the polarizing selection unit includes a Brewster window, a thin film polarizer, or a combination of a ½ wavelength plate and a polarizing beam splitter (PBS).

In one or more embodiments of the invention, the laser apparatus further includes an optical path adjustment unit. The optical path adjustment unit is arranged between the optical reflection and gain unit and the polarizing selection unit, and is configured to adjust optical paths in the cavity.

In one or more embodiments of the invention, the optical path adjustment unit includes a prism set.

In one or more embodiments of the invention, the laser apparatus further includes a driving unit that is coupled to the optical modulation unit, the driving unit configured to output a control signal to the optical modulation unit, so as to modulate the optical field incident on the optical modulation unit.

Another aspect of the invention is directed to a laser apparatus which includes an optical reflection and gain unit, optical modulation units and polarizing selection units. The optical reflection and gain unit has a gain medium and at least two dichroic surfaces, and is configured to generate a laser beam. The optical modulation unit configured to form a cavity with the optical reflection and gain unit. The optical modulation units respective correspond to phase boundaries in the cavity, so as to allow an optical field in the cavity to pass at least two of the optical modulation units. Each of the polarizing selection units is arranged between the optical reflection and gain unit and a corresponding one of the optical modulation units. The polarizing selection units are respectively configured to adjust a polarizing direction of the optical field incident to the optical modulation units.

In one or more embodiments of the invention, the optical modulation units are SLMs.

In one or more embodiments of the invention, at least one of the optical modulation units is an LCoS panel.

In one or more embodiments of the invention, at least one of the optical modulation units is a DMD.

In one or more embodiments of the invention, the laser apparatus further includes an optical path adjustment unit. The optical path adjustment unit is arranged between the optical reflection and gain unit and the polarizing selection units, and is configured to adjust optical paths in the cavity.

In one or more embodiments of the invention, the laser apparatus further includes driving units that are respectively coupled to the optical modulation units, the driving units configured to respectively output controls signal to the optical modulation units, so as to modulate the optical field incident on the optical modulation unit.

Yet another aspect of the invention is directed to a laser generation method which includes operations as follows. An optical reflection and gain unit and an optical modulation unit are provided, in which the optical reflection and gain unit has a gain medium and at least two dichroic surfaces. The optical modulation unit is arranged, such that portions of the optical modulation unit form a cavity with optical reflection and gain unit, in which the portions of the optical modulation unit respective correspond to phase boundaries in the cavity. A polarizing selection unit is arranged between the optical reflection and gain unit and the optical modulation unit, and is configured to adjust a polarizing direction of an optical field incident to the optical modulation unit. A laser beam is generated by a pump and the optical reflection and gain unit, and completes a full path of oscillating back and forth in the cavity, so as to allow an optical field in the cavity to pass through the optical modulation unit at least twice. A control signal is inputted to the optical modulation unit to adjust the optical field incident on the optical modulation unit, so as to achieve control of an output mode of the laser beam.

In one or more embodiments of the invention, the laser generation method further include an operation of arranging an optical path adjustment unit between the polarizing selection unit and the optical reflection and gain unit to adjust paths of the optical field in the cavity.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

FIG. 3 is a variant exemplary illustration of an optical path adjustment unit in FIG. 2.

FIG. 8A to FIG. 8D are various exemplary illustrations of pseudo-nondiffracting laser beam patterns and cross sections of propagating optical beams generated by the laser apparatus in FIG. 2.

FIG. 10A to FIG. 10F are an exemplary illustration of a vortex array optical beam generated through an optical modulation unit of the laser apparatus in FIG. 2, in which FIG. 10A and FIG. 10D are exemplary illustrations of optical beam patterns of the optical beam at two portions of the optical modulation unit in a laser cavity, FIG. 10B and FIG. 10E are respectively phase profiles of the corresponding optical beam patterns in FIG. 10A and FIG. 10D, and FIG. 10C and FIG. 10F are respectively projected phase profiles desired to be provided at the optical modulation unit corresponding to the optical beam patterns in FIG. 10A and FIG. 10D.

FIG. 11A to FIG. 11F are an exemplary illustration of a pseudo-nondiffracting vortex array optical beam generated through an optical modulation unit of the laser apparatus in FIG. 2, in which FIG. 11A and FIG. 11D are exemplary illustrations of optical beam patterns of the optical beam at two portions of the optical modulation unit in a laser cavity, FIG. 11B and FIG. 11E are respectively phase profiles of the corresponding optical beam patterns in FIG. 11A and FIG. 11D, and FIG. 11C and FIG. 11F are respectively projected phase profiles desired to be provided at the optical modulation unit corresponding to the optical beam patterns in FIG. 11A and FIG. 11D.

FIG. 12A to FIG. 12F are an exemplary illustration of an arbitrary optical beam generated through an optical modulation unit of the laser apparatus in FIG. 2, in which FIG. 12A and FIG. 12D are exemplary illustrations of optical beam patterns of the optical beam at two portions of the optical modulation unit in a laser cavity, FIG. 12B and FIG. 12E are respectively phase profiles of the corresponding optical beam patterns in FIG. 12A and FIG. 12D, and FIG. 12C and FIG. 12F are respectively projected phase profiles desired to be provided at the optical modulation unit corresponding to the optical beam patterns in FIG. 12A and FIG. 12D.

DETAILED DESCRIPTION

The detailed explanation of the invention is described as following. The described preferred embodiments are presented for purposes of illustrations and description, and they are not intended to limit the scope of the invention.

In this document, the terms "coupled" and "connected" may be used to indicate that two or more elements are in direct physical or electrical contact with each other, or may also mean that two or more elements may be in indirect contact with each other. "Coupled" and "connected" may also be used to indicate that two or more elements cooperate or interact with each other.

Figure 1:
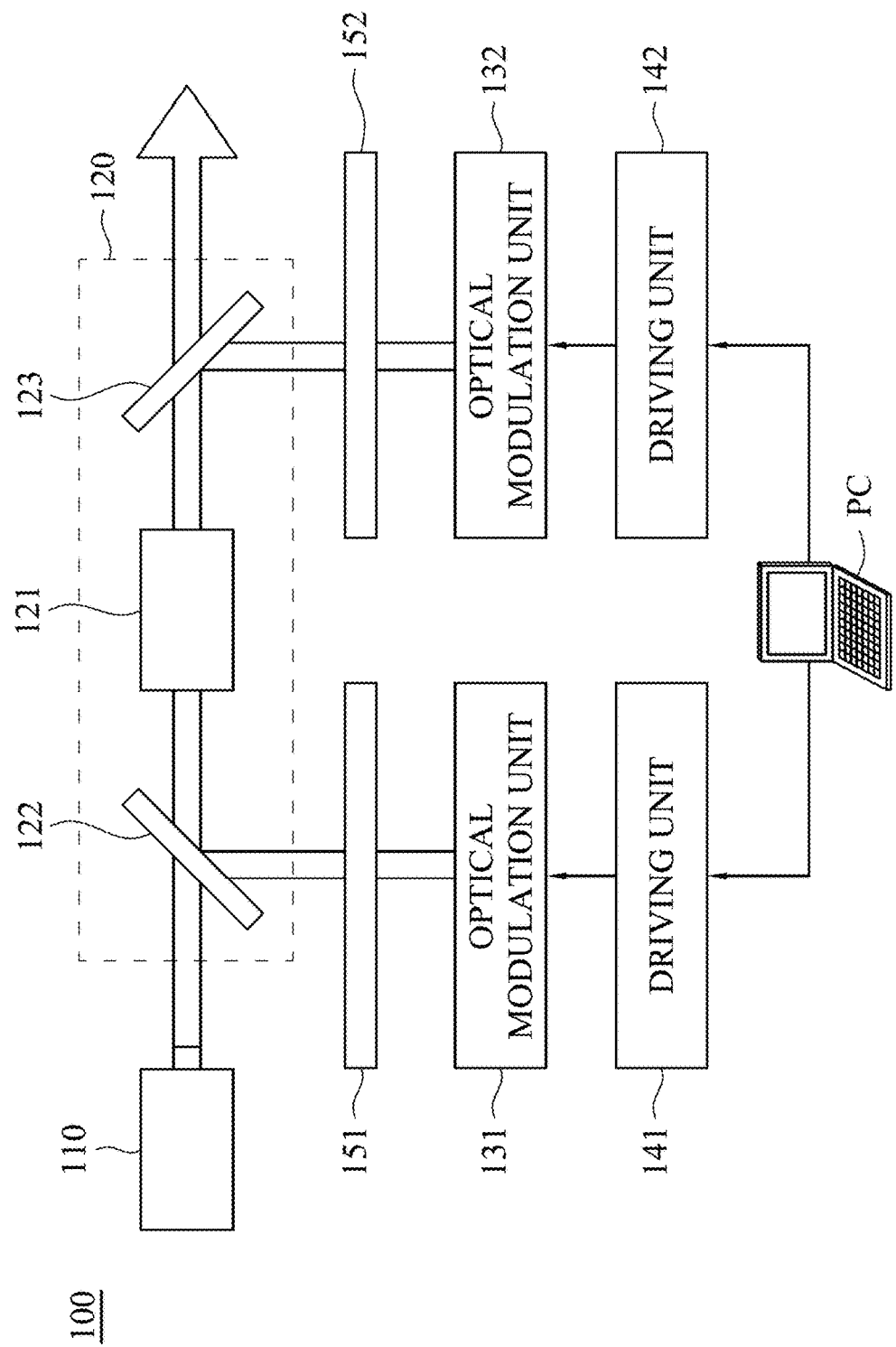
FIG. 1 is a schematic diagram of a laser apparatus in accordance with some embodiments of the invention.

Referring to FIG. 1, FIG. 1 is a schematic diagram of a laser apparatus 100 in accordance with some embodiments of the invention. In the laser apparatus 100, a pump 110 is coupled to an optical reflection and gain unit 120, and is configured to generate a pump source, such that a gain medium 121 of the optical reflection and gain unit 120 generates a laser beam by the stimulation of the pump source. The pump 110 may be an optical pump, and the gain medium 121 may be a solid state laser crystal, such as Nd:GdVO$_4$, but the invention is not limited thereto. Alternatively, the gain medium 121 may be a gaseous state gain medium (such as helium-neon), a liquid state gain medium (such as a dye) or a semiconductor gain medium, and the pump 110 may correspond to a high voltage discharge source, a dye sensitizer or a current source, but the invention is not limited thereto. In the following description, the gain medium 121 and a gain medium of another embodiment are exemplified by solid state laser crystals, but the scope of the invention is not limited thereto.

Optical modulation units 131 and 132 are reflective spatial light modulators (SLMs) which respectively change the magnitudes and/or the phases of an incident optical field and generate a reflective optical field accordingly. The optical modulation units 131 and 132 may be digital micromirror devices (DMDs), liquid crystal on silicon (LCoS) panels or other suitable optical modulation devices. In the embodiments in which the optical modulation units 131 and 132 are LCoS panels, the optical modulation units 131 and 132 may be various types of LCoS panels, such as vertical alignment (VA) type LCoS panels or twisted nematic (TN) type LCoS panels, but are not limited thereto. The optical modulation units 131 and 132 and the optical reflection and gain unit 120 form a cavity, and the laser beam oscillates in the cavity.

In addition to the gain medium 121, the optical reflection and gain unit 120 further includes dichroic mirrors 122 and 123. Each of the dichroic mirrors 122 and 123 has a dichroic surface with high transparency to the pump source that is generated by the pump 110, so as to prevent the pump source from entering the optical modulation units 131 and 132 to damage the optical modulation units 131 and 132. Moreover, each of the dichroic mirrors 122 and 123 has high reflectivity to the pump source generated by the gain medium 121, such that most the pump source generated by the gain medium 121 are reflected to the optical modulation units 131 and 132 via the dichroic mirrors 122 and 123, respectively. The laser beam outputted by the laser apparatus 100 may be a portion of the laser beam of the cavity that penetrates the dichroic mirror 122 or the dichroic mirror 123, but is not limited thereto. For example, the laser apparatus 100 may further include a polarizing beam splitter (PBS) that may be arranged at various positions in the laser apparatus 100 for guiding the laser beam to output. The PBS may be arranged in a polarizing selection unit 151 and/or a polarizing selection unit 152 that will be discussed below.

Driving units 141 and 142 are respectively coupled to the optical modulation units 131 and 132, and are respectively configured to output control signals to the optical modulation units 131 and 132, so as to modulate the optical field incident on the optical modulation unit. The driving units 141 and 142 may connect with a computer device PC, and respectively send corresponding control signals to the optical modulation units 131 and 132 according to the configuration information that is outputted by the computer device PC. The driving units 141 and 142 may respectively adjust the magnitudes and/or the phases of the optical modulation units 131 and 132, so as to adjust phase boundary conditions of the cavity and further control an output mode of the laser beam.

Because the phase modulations of the polarizing selection units 131 and 132 are polarization selective, polarizing selection units 151 and 152 are further arranged in the optical paths from the dichroic mirror 122 to the optical modulation unit 131 and from the dichroic mirror 123 to the optical modulation unit 132, respectively. The polarizing selection units 151 and 152 are configured to adjust the polarization directions of the optical field incident to the optical modulation units 131 and 132, respectively, in order to respectively match the polarization directions of the optical modulation units 131 and 132. Each of the polarizing selection units 151 and 152 may be a Brewster window (BW), a thin film polarizer or a combination of a half wavelength plate and a PBS, but is not limited thereto.

One particular point of the laser apparatus 100 is that the cavity formed thereby may allow the optical field of the laser beam to complete a full path of oscillating back and forth in the cavity, i.e. the optical field in the cavity may pass through the optical modulation units 131 and 132, in order to provide more and further complete controls on boundary conditions, thus generating more various and more stable laser modes or a superposition of various laser modes for outputting. In other embodiments, additional components may be added to the laser apparatus 100 according to the abovementioned description, and thus the laser apparatus 100 may be modified to have three or more phase boundaries. Therefore, a laser apparatus which has multiple phase boundaries derived according to the abovementioned description also belong to the scope of the invention.

Figure 2:
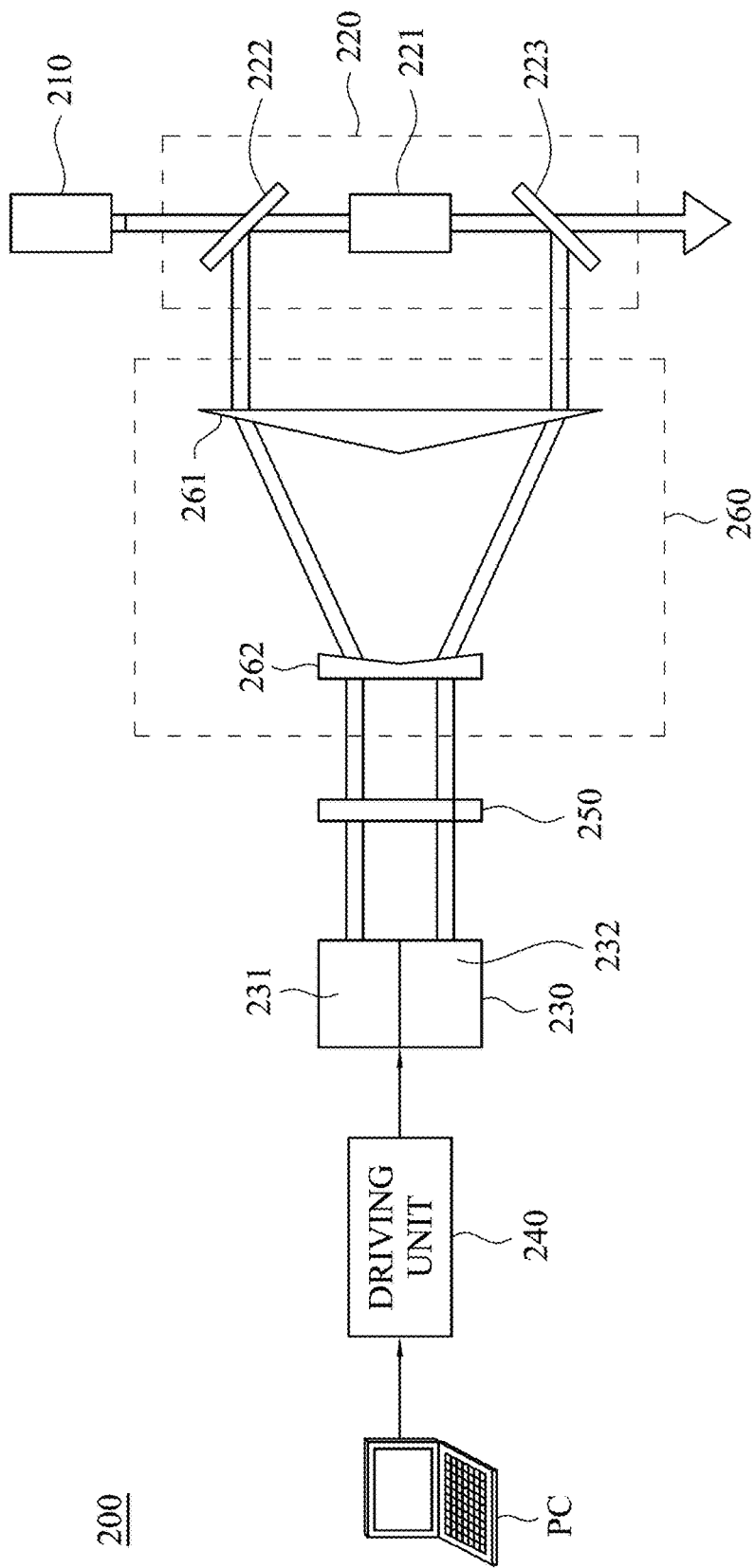
FIG. 2 is a schematic diagram of a laser apparatus in accordance with other some embodiments of the invention.

Referring to FIG. 2, FIG. 2 is a schematic diagram of a laser apparatus 200 in accordance with other some embodiments of the invention. In the laser apparatus 200, a pump 210 is coupled to an optical reflection and gain unit 220, and is configured to generate a pump source, such that a gain medium 221 of the optical reflection and gain unit 220 generates a laser beam by the stimulation of the pump source. The pump 210 may be an optical pump, and the gain medium 221 may be a solid state crystal, such as Nd:GdVO$_4$, but is not limited thereto. Alternatively, the gain medium 221 may be a gaseous state gain medium (such as helium-neon), a liquid state gain medium (such as a dye) or a semiconductor gain medium, and the pump 210 may correspond to a high voltage discharge source, a dye sensitizer or a current source, but the invention is not limited thereto.

An optical modulation unit 230 is a reflective spatial light modulator (SLM) which changes the magnitudes and/or the phases of an incident optical field and generate a reflective optical field accordingly. The optical modulation unit 230 may be a DMD, an LCoS panel or another suitable optical modulation device. In the embodiments in which the optical modulation unit 230 is an LCoS panel, the optical modulation unit 230 may be any type of an LCoS panel, such as a VA type or TN type LCoS panel, but is not limited thereto. The optical modulation unit 230 and the optical reflection and gain unit 220 form a cavity, and the laser beam oscillates in the cavity.

Further, the optical modulation unit 230 includes portions 231 and 232, and the optical reflection and gain unit 220 further includes dichroic mirrors 222 and 223. As shown in FIG. 2, the dichroic mirrors 222 and 223 respectively correspond to the portions 231 and 232 of the optical modulation unit 230. Each of the dichroic mirrors 222 and 223 has a dichroic surface with high transparency to the pump source that is generated by the pump 210, so as to prevent the pump source from entering the optical modulation unit 230 to damage the optical modulation unit 230. Moreover, each of the dichroic mirrors 222 and 223 has high reflectivity to the pump source generated by the gain medium 221, such that most the pump source generated by the gain medium 221 are reflected to the portions 231 and 232 of the optical modulation units 230 via the dichroic mirrors 222 and 223, respectively. The laser beam outputted by the laser apparatus 200 may be a portion of the laser beam of the cavity that penetrates the dichroic mirror 222 or the dichroic mirror 223, but is not limited thereto. For example, the laser apparatus 200 may further include a PBS that may be arranged at various positions in the laser apparatus 200 for guiding the laser beam to output. The PBS may be arranged in a polarizing selection unit 250 that will be discussed below.

A driving unit 240 is coupled to the optical modulation unit 230, and is configured to output a control signal to the optical modulation unit 230, so as to modulate the optical field incident on the optical modulation unit. The driving unit 240 may connect with a computer device PC, and send a corresponding control signal to the optical modulation unit 230 according to the configuration information that is outputted by the computer device PC. The driving unit 240 may adjust the magnitudes and/or the phases of the optical modulation unit 230, so as to adjust phase boundary conditions of the cavity and further control an output mode of the laser beam. It is noted that the magnitude and/or phase adjustments of the driving unit 240 to the portions 231 and 232 of the optical modulation unit 230 may be mutually independent. That is, the magnitude and/or phase adjustment of the driving unit 240 to the portion 231 of the optical modulation unit 230 does not affect the magnitude and/or phase adjustment of the driving unit 240 to the portion 232 of the optical modulation unit 230.

Because the phase modulations of the optical modulation unit 230 are polarization selective, a polarizing selection unit 250 is arranged in the optical paths from the dichroic mirror 222 to the portion 231 of the optical modulation unit 230 and from the dichroic mirror 223 to the portion 232 of the optical modulation unit 230. The polarizing selection unit 250 is configured to adjust the polarization directions of the optical field incident to the optical modulation unit 230, in order to match the polarization directions of the optical modulation unit 230. The polarizing selection units 250 may be a BW, a thin film polarizer or a combination of a half wavelength plate and a PBS, but is not limited thereto.

In some embodiments, as shown in FIG. 2, an optical path adjustment unit 260 is arranged between the polarizing selection unit 250 and the optical reflection and gain unit 220. The optical path adjustment unit 260 is configured to adjust light path of the oscillating optical field in the cavity, so as to enable an enough space for setting the optical reflection and gain unit 220, and to enable that the optical field reflected via the dichroic mirrors 222 and 223 enters the optical modulation unit 230. As shown in FIG. 2, the optical path adjustment unit 260 includes a prism set which consists of prisms 261 and 262 that are respectively convex and concave. In other embodiments, the optical path adjustment unit 260 may include lenses, prisms, reflective mirrors, combinations thereof, or another suitable component. The optical path adjustment unit 260 may also have various aspects according to the arrangements of the dichroic mirrors 222 and 223 and the optical modulation unit 230. For example, as shown in FIG. 3, an optical path adjustment unit 260' includes a prism set which consists of prisms 263 and 264 that are all convex.

Figure 4:
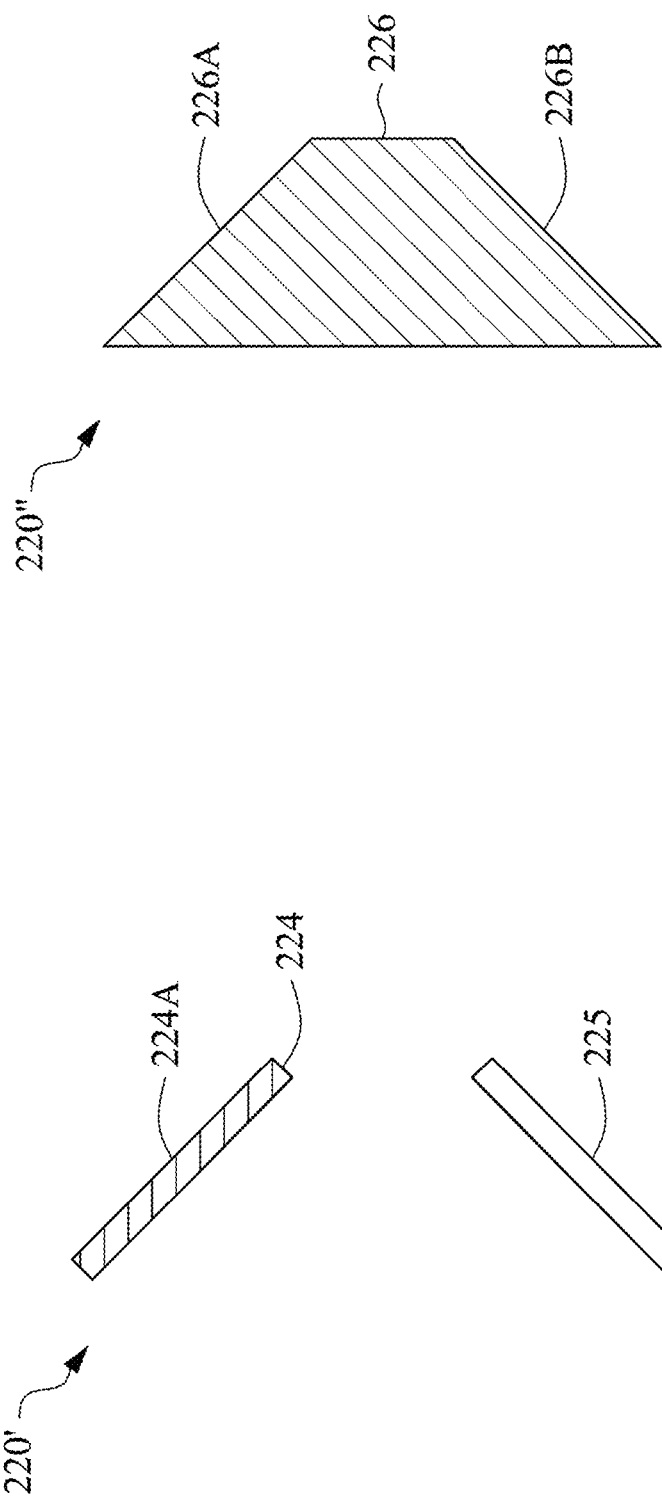
FIG. 4A and FIG. 4B are various exemplary illustration of an optical reflection and gain unit in FIG. 2.

Further, the optical reflection and gain unit 220 may also have various aspects. For example, FIG. 4A and FIG. 4B are modified embodiments of the optical reflection and gain unit 220 in FIG. 2, respectively. In FIG. 4A, the optical reflection and gain unit 220' includes a gain medium 224 and a dichroic mirror 225. The gain medium 224 is made with a dichroic mirror shape, and the laser crystal material of the gain medium 224 may be the same as the gain medium 221. The gain medium 224 further includes a dichroic surface 224A, the function of which is the same as the dichroic mirror 222. In comparison with the optical reflection and gain unit 220 in FIG. 2, the disposition space of the optical reflection and gain unit 220' in FIG. 4A may be further smaller. In FIG. 4B, the optical reflection and gain unit 220" only includes a gain medium 226. The gain medium 226 with a trapezoidal prism shape, and the laser crystal material of which is the same as the gain medium 221. The gain medium 226 further includes dichroic surfaces 226A and 226B, the function of which are respectively the same as the dichroic mirrors 222 and 223.

One particular point of the laser apparatus 200 is that the cavity formed thereby may allow the optical field of the laser beam to complete a full path of oscillating back and forth in the cavity, i.e. the optical field in the cavity may pass through the portions 231 and 232 of the optical modulation unit 230, in order to provide more and further complete controls on boundary conditions, thus generating more various and more stable laser modes or a superposition of various laser modes for outputting. In addition, in comparison with the laser apparatus 100 in FIG. 1, the laser apparatus 200 requires only a single optical modulation unit to form a laser cavity with two cavity phase boundary control mechanisms of two controls on phase boundaries in the cavity, and thus the hardware cost can be further saved. In other embodiments, the optical modulation unit 230 may be configured to have three or more portions according to its resolution and the environment setup requirement of the laser apparatus 200, and additional components may be added to the laser apparatus 200 according to the portion arrangement of the optical modulation unit 230 and the abovementioned description, and thus the laser apparatus 200 may be modified to have a laser cavity with three or more adjustable phase boundaries in the cavity. Therefore, a laser apparatus which has multiple controllable phase boundaries in the cavity derived according to the abovementioned description also belongs to the scope of the invention.

Figure 5:
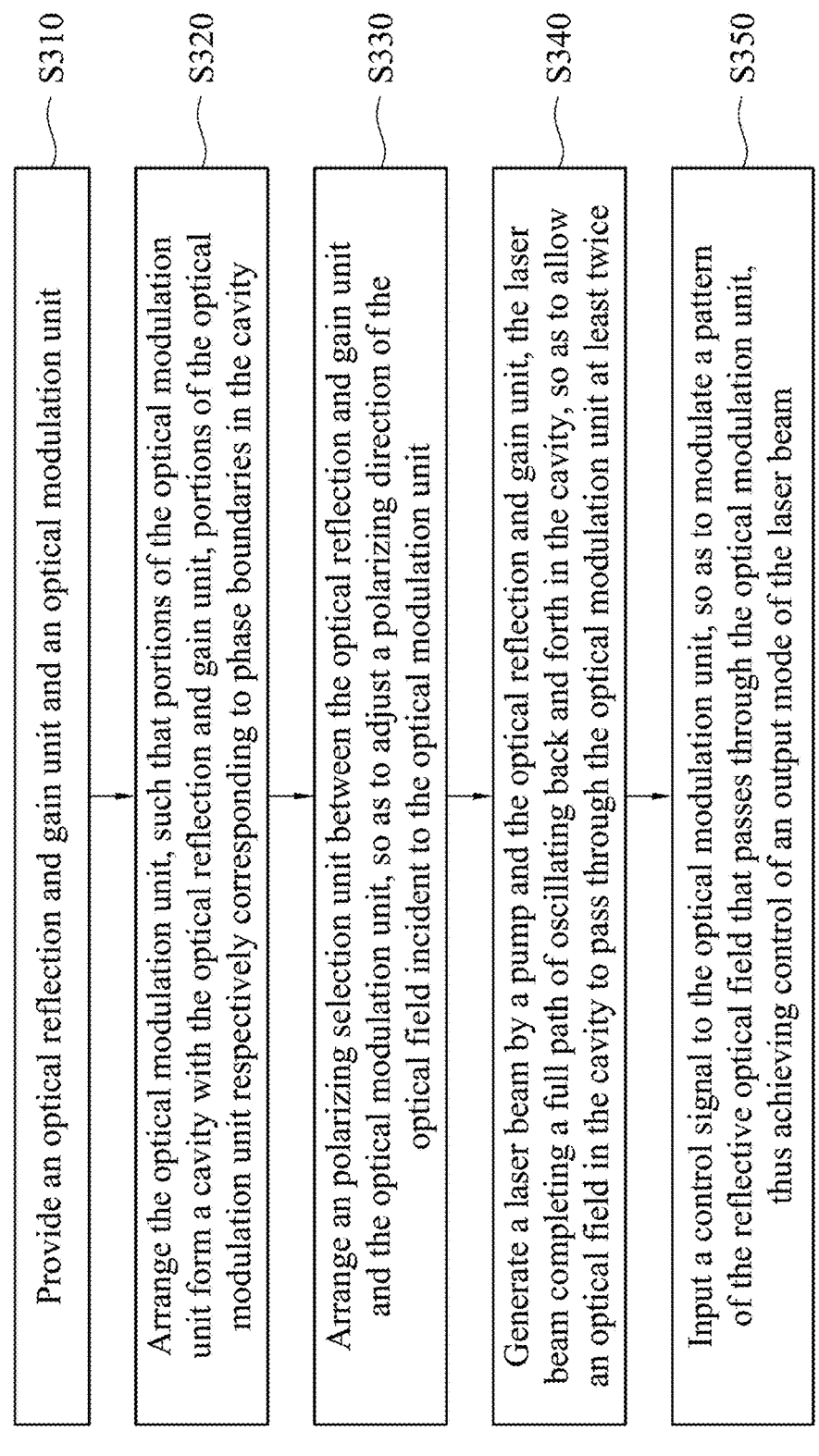
FIG. 5 is a flow chart of a laser generation method in accordance with other some embodiments of the invention.

FIG. 5 is a flowchart of a laser generation method 200 in accordance with some embodiments of the invention. The laser generation method 300 is applicable to the laser apparatus 200 in FIG. 2 or another similar laser apparatus, and includes the following steps. First, Step S310 is performed, in which an optical reflection and gain unit and an optical modulation unit are provided. The optical reflection and gain unit may be the optical reflection and gain unit 220 in FIG. 2, the optical reflection and gain unit 220' in FIG. 4A, the optical reflection and gain unit 220" in FIG. 4B or another suitable optical reflection and gain unit, and the optical modulation unit may be the optical modulation unit 230 of FIG. 2 or another suitable optical modulation unit. Afterwards, Step S320 is performed, in which the optical modulation unit is arranged, such that portions of the optical modulation unit form a cavity with the optical reflection and gain unit. The portions of the optical modulation unit respectively correspond to phase boundaries in the cavity. Then, Step S330 is performed, in which a polarizing selection unit is arranged between the optical reflection and gain unit and the optical modulation unit, so as to adjust a polarizing direction of the optical field incident to the optical modulation unit. The polarizing selection unit may be the polarizing selection unit 250 in FIG. 2 or another suitable polarizing selection unit. Thereafter, Step S340 is performed, in which a laser beam is generated by a pump and the optical reflection and gain unit; the laser beam completes a full path of oscillating back and forth in the cavity, so as to allow an optical field in the cavity to pass through the optical modulation unit at least twice. The pump may be the pump 210 in FIG. 2 or another suitable pump, and the optical reflection and gain unit generates a laser beam by the stimulation of a pump source that is generated by the pump. Such pump source may be generated by, for example, the pump 210 or another suitable pump. Then, Step S350 is performed, in which a control signal is inputted to the optical modulation unit, so as to modulate a pattern of the reflective optical field that passes through the optical modulation unit, thus achieving control of an output mode of the laser beam. The control signal inputted to the optical modulation unit may be generated by a driving unit that is coupled to the optical modulation unit the driving unit 240 in FIG. 2.

According to the laser generation method 300 in FIG. 5, because the optical modulation unit includes multiple portions that correspond to the phase boundaries in the cavity, the optical field can complete a full path of oscillating back and forth in the cavity and pass through at least two portions of the optical modulation unit (i.e. passing through the optical modulation unit at least twice).

Moreover, in some embodiments, the laser generation method 300 further includes arranging an optical path adjustment unit between the polarizing selection unit and the optical reflection and gain unit to adjust the paths of the optical field in the cavity. The optical path adjustment unit may be the optical path adjustment unit 260 in FIG. 2, the optical path adjustment unit 260' in FIG. 3, or another one that consists of a lens, a prism, a reflective mirror, a combination thereof or another suitable component.

It is noted that the laser generation method 300 in FIG. 5 is applied to a laser apparatus that has a single optical modulation unit (such as the laser apparatus 200). In other embodiments, the laser generation method 300 may be modified to be applied to a laser apparatus that includes multiple optical modulation units (such as the laser apparatus 100) according to the descriptions of FIG. 1 and FIG. 5, and thus any modified embodiment derived according to the laser generation method 300 also belongs to the scope of the invention. In addition, in other embodiments, the sequence of the steps of the laser generation method 300 may be correspondingly modified in accordance with various operation requirements. For example, Step S330 may be modified to be performed between Step S310 and Step S320. Accordingly, any step modulation derived according to the laser generation method 300 also belongs to the scope of the invention.

Figure 6C:
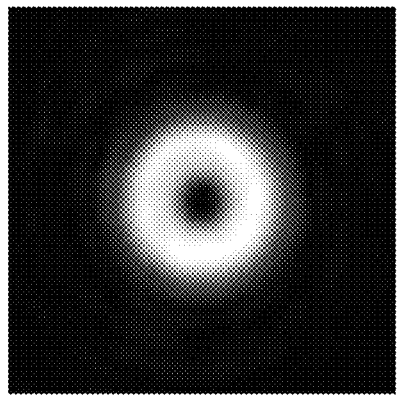
FIG. 6A to FIG. 6C are various exemplary illustrations of vortex laser beam patterns generated by the laser apparatus in FIG. 2.
Figure 6F:
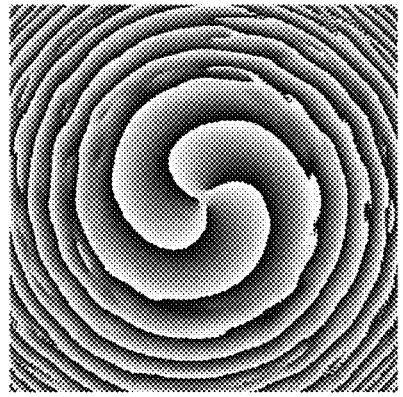
FIG. 6D to FIG. 6F are respectively phase profiles of the vortex laser beam patterns in FIG. 6A to FIG. 6C.
Figure 6B:
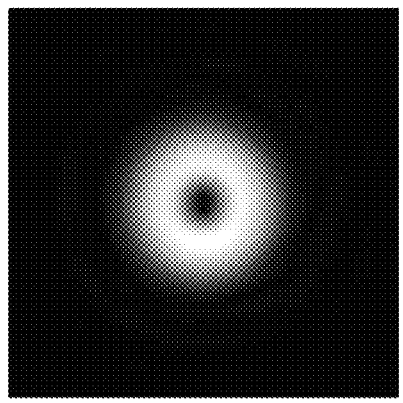
Figure 6E:
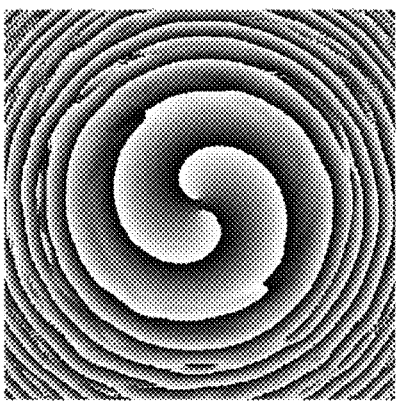
Figure 6A:
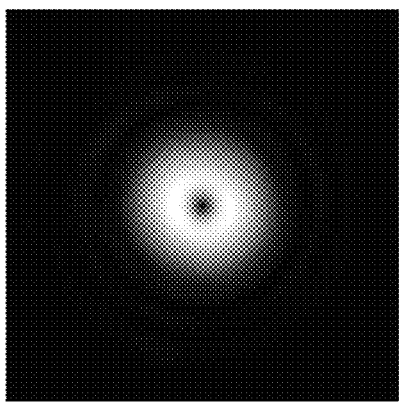
Figure 6D:
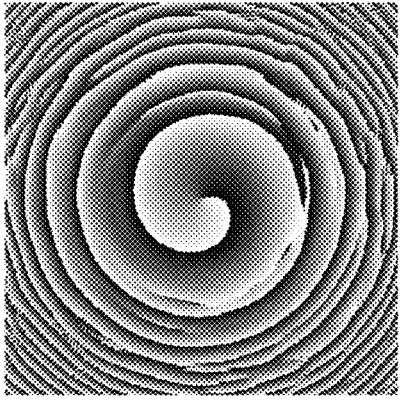
Figure 7A:
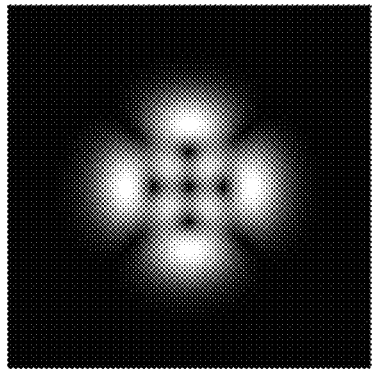
FIG. 7A to FIG. 7D are various exemplary illustrations of vortex array laser beam patterns generated by the laser apparatus in FIG. 2.
Figure 7B:
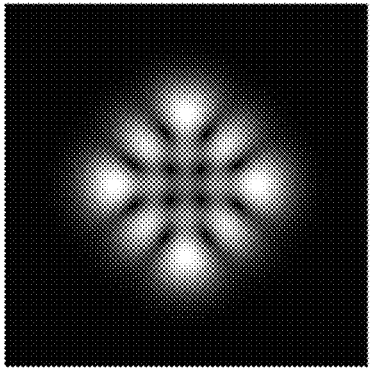
Figure 7C:
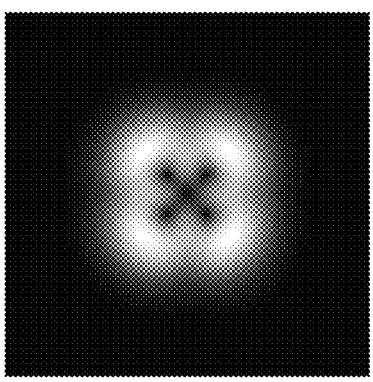
Figure 7D:
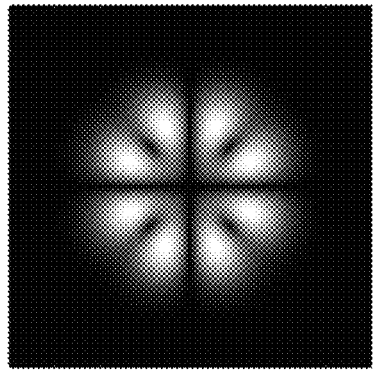
Figure 7E:
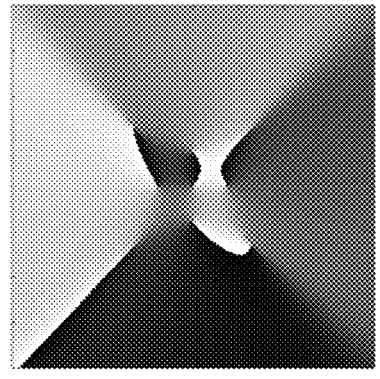
FIG. 7E to FIG. 7H are respectively phase profiles of the vortex array laser beam patterns in FIG. 7A to FIG. 7D.
Figure 7F:
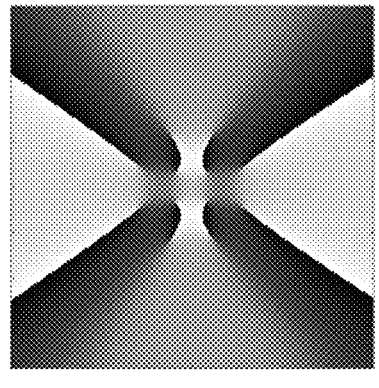
Figure 7G:
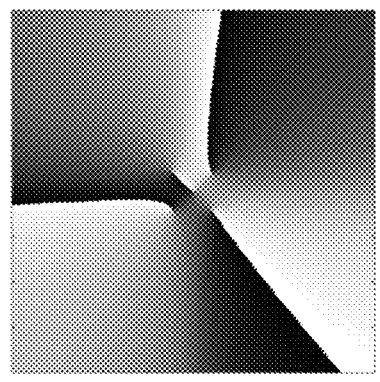
Figure 7H:
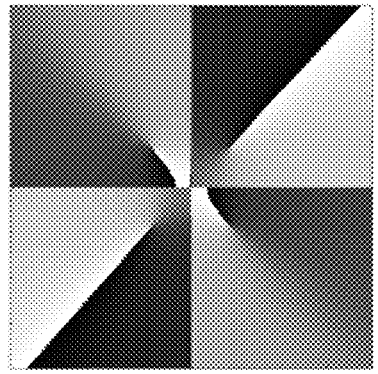

FIG. 6A to FIG. 6C are various exemplary illustrations of vortex laser beam patterns generated by the laser apparatus 200, which respectively correspond to an $LG_{0,1}$ mode, an $LG_{0,2}$ mode and an $LG_{0,3}$ mode of Laguerre-Gaussian (LG) modes (i.e. the corresponding topological charges are respectively 1 to 3), and FIG. 6D to FIG. 6F are phase profiles which respectively correspond to the vortex laser beam patterns shown in FIG. 6A to FIG. 6C, respectively. As can be seen from FIG. 6A to FIG. 6F, the laser apparatus 200 can generate various angular momentums of vortex laser beams.

FIG. 7A to FIG. 7D are various exemplary illustrations of vortex array laser beam patterns generated by the laser apparatus 200, which respectively correspond to superpositions of laser bean patterns of an $IG^e_{3,3}$ mode, an $IG^e_{4,4}$ mode, an $IG^o_{3,3}$ mode and an $IG^o_{4,4}$ mode of Ince-Gaussian (IG) modes and corresponding laser beam patterns of 90 degree rotations thereof, where $IG^e_{\cdot,\cdot}$ and $IG^o_{\cdot,\cdot}$ are respectively even and odd IG modes, $IG^{\cdot}_{3,3}$ and $IG^{\cdot}_{4,4}$ are respectively IG modes with mode orders of (3,3) and (4,4), and FIG. 7E to FIG. 7H are phase profiles which respectively correspond to the vortex array laser beam patterns shown in FIG. 7A to FIG. 7D, respectively. As can be seen from FIG. 7A to FIG. 7H, the laser apparatus 200 can generate various angular momentums of vortex array laser beams.

FIG. 8A to FIG. 8D are various exemplary illustrations of pseudo-nondiffracting laser beam patterns and cross sections of propagating optical beams generated by the laser apparatus 200, which respectively correspond to a cosine-Gauss (CG) mode, a fourth-order Bessel-Gauss (BG) mode, a third-order Mathieu-Gauss (MG) mode with a characteristic parameter of 5 and a parabolic-Gauss (PG) mode with a beam order of 5. In any of FIG. 8A to FIG. 8D, the left side is a transversal pattern profile of a pseudo-nondiffracting laser beam, while the right side is a cross section profile along the propagation direction of an optical beam. As can be seen from FIG. 8A to FIG. 8D, the laser apparatus 200 can generate various modes of pseudo-nondiffracting laser beams, and such pseudo-nondiffracting laser beams do not diverge in a certain distance and have a particular point of long focal depth. In addition, various modes of pseudo-nondiffracting laser beams generated by the laser apparatus 200 can be recover after propagating a certain distance under a partial block by an obstacle, thus having a self-healing characteristic.

FIG. 9A to FIG. 9I are various exemplary illustrations of optical beam superpositions of multiple modes generated by the laser apparatus 200, the superpositioned nodes of which are as shown in TABLE 1, where $HG_{m,n}$ is a Hermite-Gaussian (HG) mode, m, n are node numbers respectively in horizontal and vertical directions, $MG^e_n$, is an $m^{th}$-order even MG mode, and $(.)^T$ represents a transport operation, i.e. rotating a laser beam pattern by 90 degree.

TABLE 1

Figure 9A:
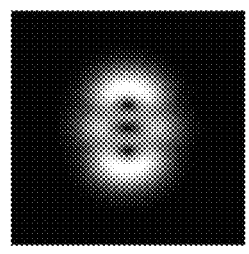
FIG. 9A to FIG. 9I are various exemplary illustrations of optical beam superpositions of multiple modes generated by the laser apparatus in FIG. 2.
Figure 9B:
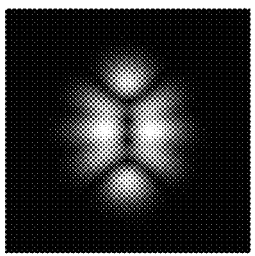
Figure 9C:
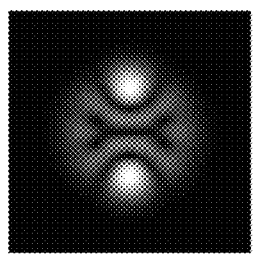
Figure 9D:
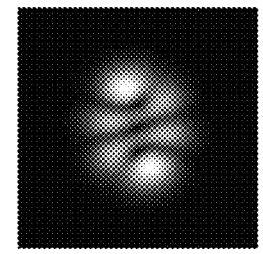
Figure 9E:
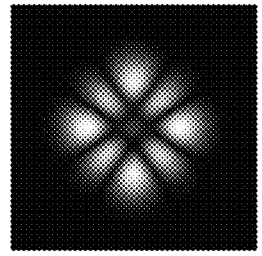
Figure 9F:
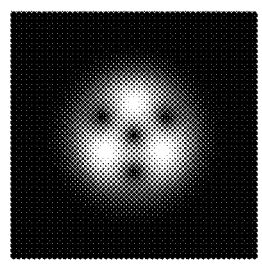
Figure 9G:
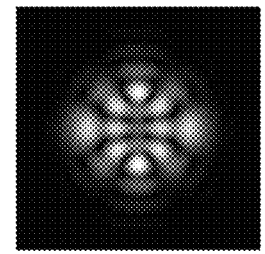
Figure 9H:
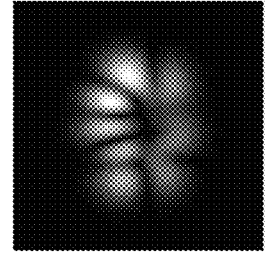
Figure 9I:
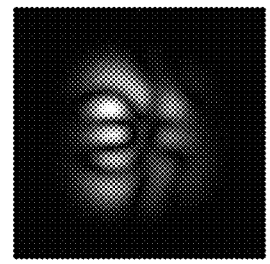

| | |
|---|---|
| FIG. 9A | $IG^e_{3,3} + e^{(i\pi/2)} \times IG^o_{3,3}$ |
| FIG. 9B | $IG^e_{3,3} + e^{(i\pi/4)} \times IG^o_{3,3}$ |
| FIG. 9C | $MG^e_4 + e^{(i\pi/2)} \times (IG^e_{4,4})^T$ |
| FIG. 9D | $HG_{4,1} + e^{(i\pi/2)} \times IG^e_{4,4}$ |
| FIG. 9E | $IG^e_{4,4} + (IG^e_{4,4})^T$ |
| FIG. 9F | $LG_{0,3} + IG^e_{4,4} + HG_{4,1}$ |
| FIG. 9G | $LG_{0,5} + IG^o_{3,3}$ |
| FIG. 9H | $LG_{0,4} + LG_{0,1}$ |
| FIG. 9I | $LG_{0,3} + IG^e_{4,4} + HG_{4,1} + (IG^o_{6,2})^T$ |

As can be seen from FIG. 9A to FIG. 9I, the laser apparatus 200 can control laser outputting of superposition modes generated from laser beams with arbitrary multiple laser modes; if the superpositions of the laser modes are all pseudo-nondiffracting laser beams, the laser beams of superpositioned modes do not diverge in a certain distance and have a particular point of long focal depth.

Figure 10A:
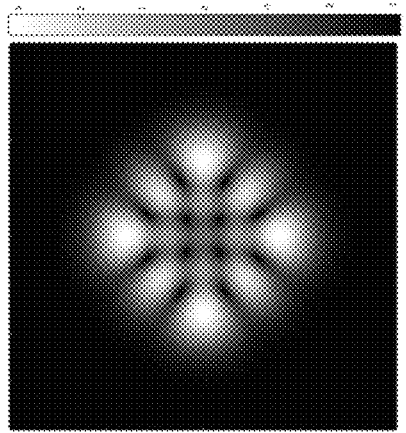
Figure 10B:
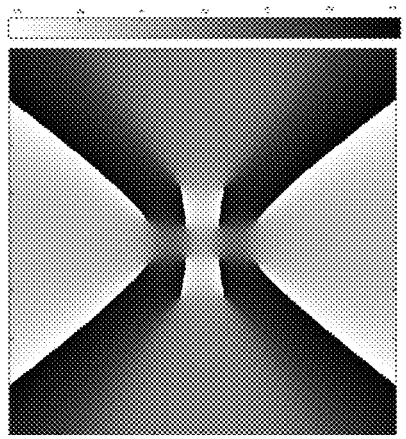
Figure 10C:
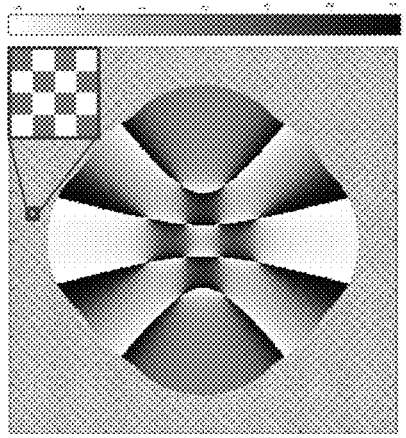
Figure 10D:
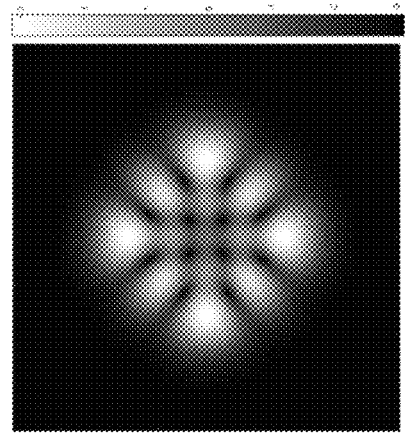
Figure 10E:
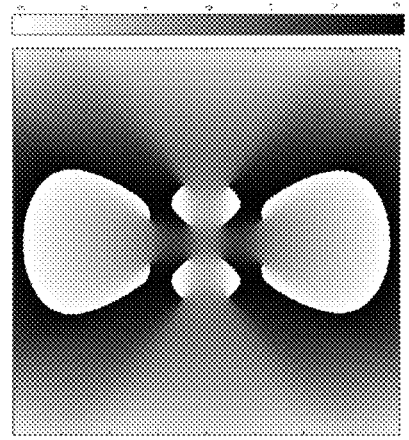
Figure 10F:
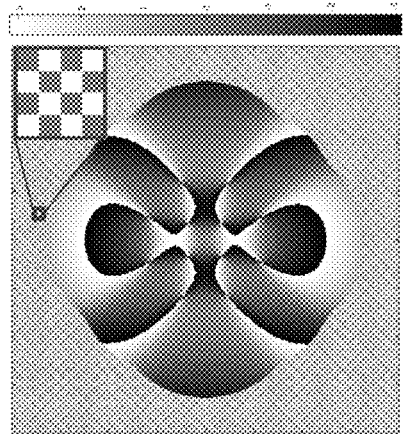

FIG. 10A to FIG. 10F are an exemplary illustration of a vortex array optical beam generated through the optical modulation unit 230 of the laser apparatus 200. The mode of the vortex array optical beam is a superposition of an $IG^e_{4,4}$ mode and an $e^{(i\pi/2)} \times (IG^e_{4,4})^T$ mode. In the path of the optical field to the portion 231 of the optical modulation unit 230, FIG. 10A and FIG. 10B are an intensity distribution profile and a phase profile of a vortex array optical beam that is desired to be generated at the portion 231 of the optical modulation unit 230, respectively, and FIG. 10C is a projected phase profile of the portion 231 of the optical modulation unit 230 derived backward according to the profiles shown in FIG. 10A and FIG. 10B. By adjusting the configuration parameters of the portion 231 of the optical modulation unit 230 based on the projected phase profile shown in FIG. 10C, the intensity distribution profile and the phase profile of the desired optical beam shown in FIG. 10A and FIG. 10B can be obtained. In the path of the optical field to the portion 232 of the optical modulation unit 230, FIG. 10D and FIG. 10E are an intensity distribution profile and a phase profile of a vortex array optical beam that is intended to be propagated from the portion 231 to the portion 232, respectively, and FIG. 10F is a projected phase profile of the portion 232 of the optical modulation unit 230 derived backward according to the profiles shown in FIG. 10D and FIG. 10E. By adjusting the configuration parameters of the portion 232 of the optical modulation unit 230 based on the projected phase profile shown in FIG. 10F, the intensity distribution profile and the phase profile of the desired optical beam shown in FIG. 10D and FIG. 10E can be obtained.

Figure 11A:
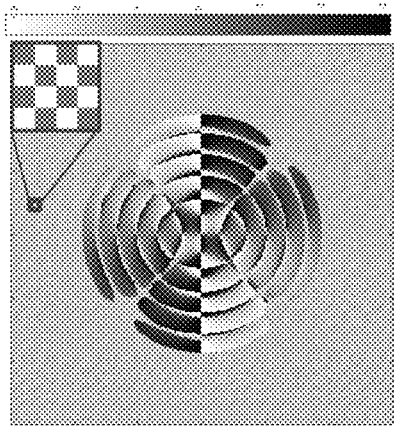
Figure 11D:
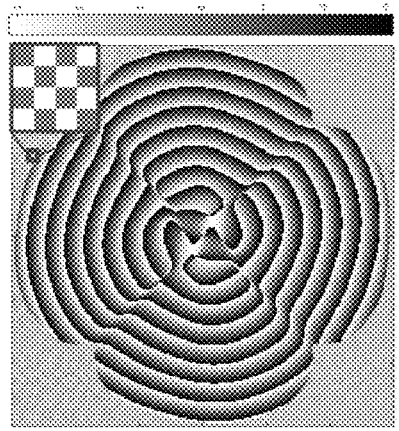
Figure 11B:
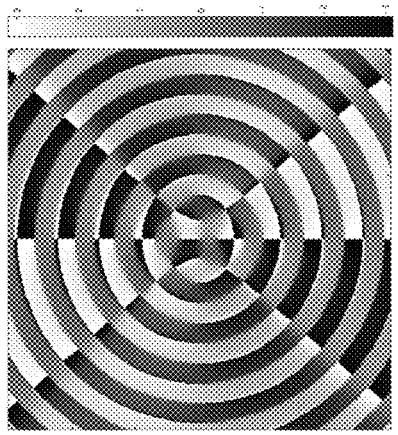
Figure 11E:
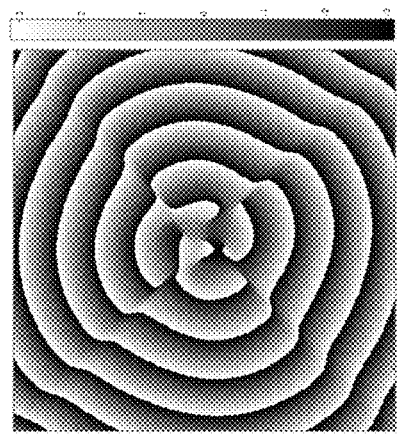
Figure 11C:
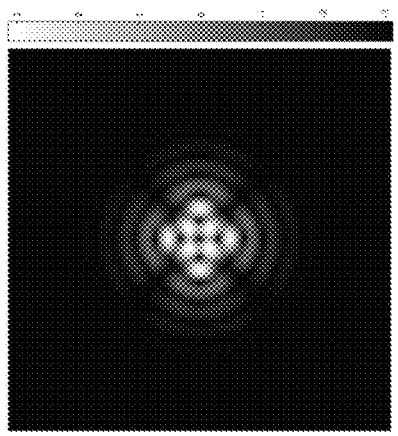
Figure 11F:
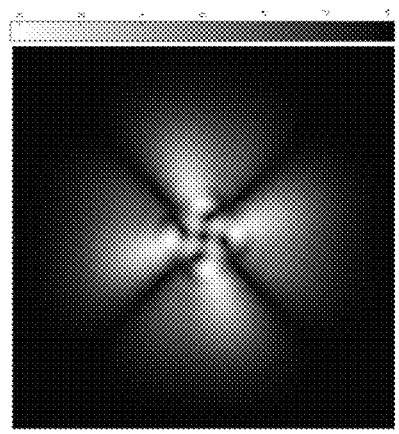

FIG. 11A to FIG. 11F are an exemplary illustration of a pseudo-nondiffracting vortex array optical beam generated through the optical modulation unit 230 of the laser apparatus 200. The mode of the pseudo-nondiffracting vortex array optical beam is a superposition of an $MG^e_4$ mode and an $e^{(m/2)} \times (MG^e_4)^T$ mode. In the path of the optical field to the portion 231 of the optical modulation unit 230, FIG. 11A and FIG. 11B are an intensity distribution profile and a phase profile of a vortex array optical beam that is desired to be generated at the portion 231 of the optical modulation unit 230, respectively, and FIG. 11C is a projected phase profile of the portion 231 of the optical modulation unit 230 derived backward according to the profiles shown in FIG. 11A and FIG. 11B. By adjusting the configuration parameters of the portion 231 of the optical modulation unit 230 based on the projected phase profile shown in FIG. 11C, the intensity distribution profile and the phase profile of the desired optical beam shown in FIG. 11A and FIG. 11B can be obtained. In the path of the optical field to the portion 232 of the optical modulation unit 230, FIG. 11D and FIG. 11E are an intensity distribution profile and a phase profile of a vortex array optical beam that is intended to be propagated from the portion 231 to the portion 232, respectively, and FIG. 11F is a projected phase profile of the portion 232 of the optical modulation unit 230 derived backward according to the profiles shown in FIG. 11D and FIG. 11E. By adjusting the configuration parameters of the portion 232 of the optical modulation unit 230 based on the projected phase profile shown in FIG. 11F, the intensity distribution profile and the phase profile of the desired optical beam shown in FIG. 11D and FIG. 11E can be obtained.

Figure 12A:
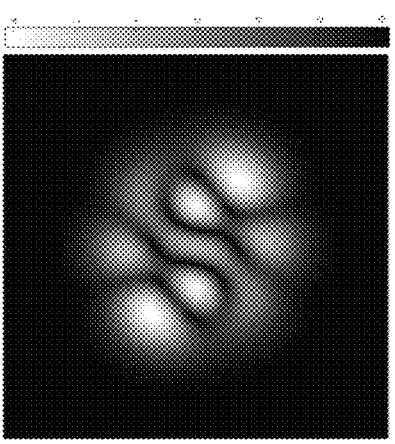
Figure 12B:
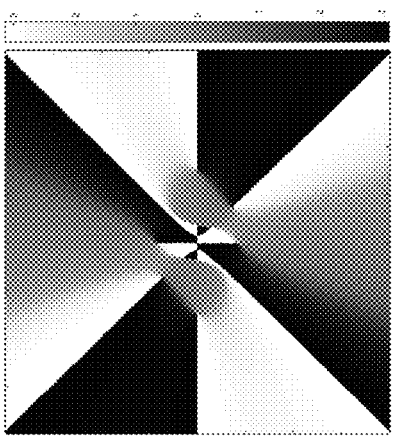
Figure 12C:
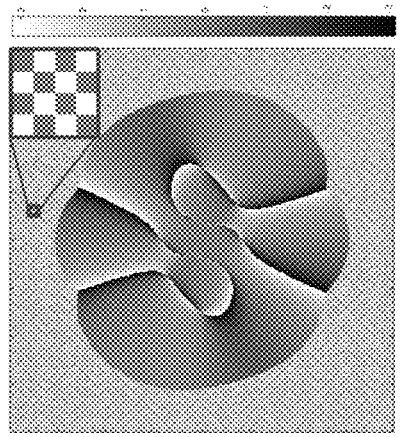
Figure 12D:
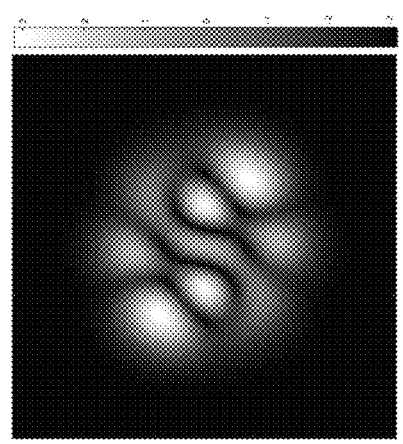
Figure 12E:
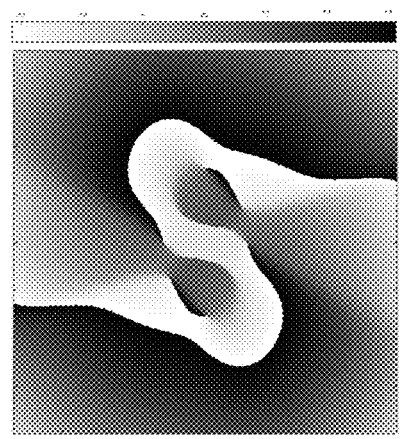
Figure 12F:
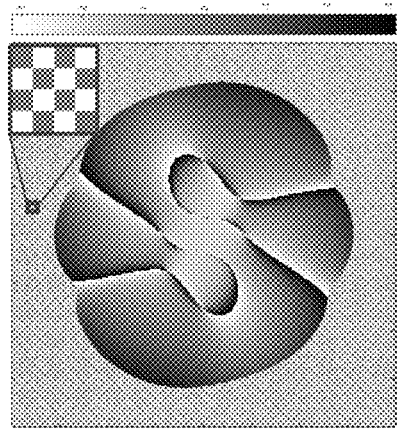

FIG. 12A to FIG. 12F are an exemplary illustration of an arbitrary optical beam generated through the optical modulation unit 230 of the laser apparatus 200. The mode of the arbitrary optical beam is a superposition of an $HG_{3,1}$ mode, a $2 \times IG^e_{4,2}$ mode and an $LG_{0,4}$ mode. In the path of the optical field to the portion 231 of the optical modulation unit 230, FIG. 12A and FIG. 12B are an intensity distribution profile and a phase profile of an optical beam that is desired to be generated at the portion 231 of the optical modulation unit 230, respectively, and FIG. 12C is a projected phase profile of the portion 231 of the optical modulation unit 230 derived backward according to the profiles shown in FIG. 12A and FIG. 12B. By adjusting the configuration parameters of the portion 231 of the optical modulation unit 230 based on the projected phase profile shown in FIG. 12C, the intensity distribution profile and the phase profile of the desired optical beam shown in FIG. 12A and FIG. 12B can be obtained. In the path of the optical field to the portion 232 of the optical modulation unit 230, FIG. 12D and FIG. 12E are an intensity distribution profile and a phase profile of an optical beam that is intended to be propagated from the portion 231 to the portion 232, respectively, and FIG. 12F is a projected phase profile of the portion 232 of the optical modulation unit 230 derived backward according to the profiles shown in FIG. 12D and FIG. 12E. By adjusting the configuration parameters of the portion 232 of the optical modulation unit 230 based on the projected phase profile shown in FIG. 12F, the intensity distribution profile and the phase profile of the desired optical beam shown in FIG. 12D and FIG. 12E can be obtained.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A laser apparatus, comprising:
    an optical reflection and gain unit having a gain medium and at least two dichroic surfaces, the optical reflection and gain unit configured to generate a laser beam;
    an optical modulation unit configured to form a laser cavity with the optical reflection and gain unit and to adjust phase boundary conditions of the laser cavity, the optical modulation unit having a plurality of portions that respectively correspond to a plurality of phase boundaries in the laser cavity, so as to allow an optical field in the laser cavity to pass through the optical modulation unit at least twice; and
    a polarizing selection unit arranged between the optical reflection and gain unit and the optical modulation unit, the polarizing selection unit configured to adjust a polarizing direction of the optical field incident to the optical modulation unit.

2. The laser apparatus of claim 1, wherein the optical modulation unit is a spatial light modulator (SLM).

3. The laser apparatus of claim 2, wherein the optical modulation unit is a liquid crystal on silicon (LCoS) panel.

4. The laser apparatus of claim 2, wherein the optical modulation unit is a digital micromirror device (DMD).

5. The laser apparatus of claim 1, wherein the optical reflection and gain unit further comprises two dichroic mirrors;
    wherein the dichroic mirrors respectively have two of the dichroic surfaces, and the gain medium is arranged between the dichroic mirrors.

6. The laser apparatus of claim 1, wherein two of the dichroic surfaces are two side surfaces of the gain medium.

7. The laser apparatus of claim 1, wherein the optical reflection and gain unit further comprises a dichroic mirror;
    wherein the dichroic mirror has one of the dichroic surfaces, and the gain medium has another one of the dichroic surfaces.

8. The laser apparatus of claim 1, wherein the polarizing selection unit comprises a Brewster window, a thin film polarizer, or a combination of a half wavelength plate and a polarizing beam splitter (PBS).

9. The laser apparatus of claim 1, further comprising:
    an optical path adjustment unit arranged between the optical reflection and gain unit and the polarizing selection unit, the optical path adjustment unit configured to adjust optical paths in the laser cavity.

10. The laser apparatus of claim 9, wherein the optical path adjustment unit comprises a prism set.

11. The laser apparatus of claim 1, wherein the gain medium comprises Nd:GdVO4.

12. The laser apparatus of claim 1, further comprising:
    a driving unit coupled to the optical modulation unit, the driving unit configured to output a control signal to the optical modulation unit, so as to modulate a pattern of a reflected optical field in the laser cavity.

13. A laser apparatus, comprising:
    an optical reflection and gain unit having a gain medium and at least two dichroic surfaces, the optical reflection and gain unit configured to generate a laser beam;
    a plurality of optical modulation units configured to form a laser cavity with the optical reflection and gain unit, wherein the optical modulation units respectively correspond to a plurality of phase boundaries in the laser cavity, so as to allow an optical field in the laser cavity to pass at least two of the optical modulation units; and
    a plurality of polarizing selection units each arranged between the optical reflection and gain unit and a corresponding one of the optical modulation units, the polarizing selection units respectively configured to adjust a polarizing direction of the optical field incident to the optical modulation units.

14. The laser apparatus of claim 13, wherein the optical modulation units are spatial light modulators (SLMs).

15. The laser apparatus of claim 14, wherein at least one of the optical modulation units is a liquid crystal on silicon (LCoS) panel.

16. The laser apparatus of claim 14, wherein at least one of the optical modulation units is a digital micromirror device (DMD).

17. The laser apparatus of claim 13, further comprising:
an optical path adjustment unit arranged between the optical reflection and gain unit and the polarizing selection units, the optical path adjustment unit configured to adjust optical paths in the laser cavity.

18. The laser apparatus of claim 13, further comprising:
a plurality of driving units respectively coupled to the optical modulation units, the driving units configured to respectively output control signals to the optical modulation unit, so as to modulate the optical field incident on the optical unit.

19. A laser generation method, comprising:
providing an optical reflection and gain unit and an optical modulation unit, the optical reflection and gain unit having a gain medium and at least two dichroic surfaces;
arranging the optical modulation unit, such that a plurality of portions of the optical modulation unit form a laser cavity with the optical reflection and gain unit, wherein the portions of the optical modulation unit respectively correspond to a plurality of phase boundaries in the laser cavity;
arranging a polarizing selection unit between the optical reflection and gain unit and the optical modulation unit, wherein the polarizing selection unit is configured to adjust a polarizing direction of an optical field incident to the optical modulation unit;
generating a laser beam by a pump and the optical reflection and gain unit, wherein the laser beam completes a full path of oscillating back and forth in the laser cavity, so as to allow an optical field in the laser cavity to pass through the optical modulation unit at least twice; and
inputting a control signal to the optical modulation unit to adjust a pattern of a reflected optical field that passes the optical modulation unit, so as to achieve control of an output mode of the laser beam.

20. The laser generation method of claim 19, further comprising:
arranging an optical path adjustment unit between the polarizing selection unit and the optical reflection and gain unit to adjust paths of the optical field in the laser cavity.

* * * * *